United States Patent [19]

Bergqvist

[11] Patent Number: 4,464,659

[45] Date of Patent: Aug. 7, 1984

[54] METHOD AND AN APPARATUS FOR REMOTE CONTROL OF A VEHICLE OR A MOBILE ENGINE

[75] Inventor: Lars K. Bergqvist, Falköping, Sweden

[73] Assignee: Saab-Scania Aktiebolag, Linkoping, Sweden

[21] Appl. No.: 346,046

[22] PCT Filed: Jun. 29, 1981

[86] PCT No.: PCT/SE81/00191
§ 371 Date: Jan. 28, 1982
§ 102(e) Date: Jan. 28, 1982

[87] PCT Pub. No.: WO82/00122
PCT Pub. Date: Jan. 21, 1982

[30] Foreign Application Priority Data

Jul. 1, 1980 [SE] Sweden ................................ 8004842

[51] Int. Cl.³ .......................... H04Q 9/00; H04B 1/00; B62D 1/28
[52] U.S. Cl. ................................. 340/825.7; 180/168; 340/825.69
[58] Field of Search ............ 340/825.7, 825.03, 825.51, 340/825.72, 825.76, 825.69; 364/424, 478; 180/168, 167

[56] References Cited

U.S. PATENT DOCUMENTS 3,540,541 11/1970 Hartley et al. ...................... 180/168
3,639,755 2/1972 Wrege ............................ 340/825.69
4,379,497 4/1983 Hainsworth et al. ................ 180/168

Primary Examiner—Donald J. Yusko
Attorney, Agent, or Firm—James E. Nilles

[57] ABSTRACT

In a system wherein a vehicle can be remotely controlled from any one of a plurality of control devices, each of which can emit operation command signals to the vehicle, each control device can also emit switching signals, each designating one of the other control devices and assigning control to the one designated. Each control device emits its signals in a mode unique to it, and the vehicle has a receiver for each control device, capable of receiving only signals from its control device, and a switching circuit connected with each receiver. Each switching circuit has an enabled and a disabled condition. When enabled, it carries operation signals from its receiver to actuating means whereby commands signified by operating signals are executed. Each switching circuit is enabled when it receives valid signals from its receiver and also receives an input from another switching circuit, produced in response to a switching signal assigning control to the control device corresponding to the thus-enabled switching circuit. An enabled switching circuit issues to all other switching circuits an output which disables them.

6 Claims, 3 Drawing Figures

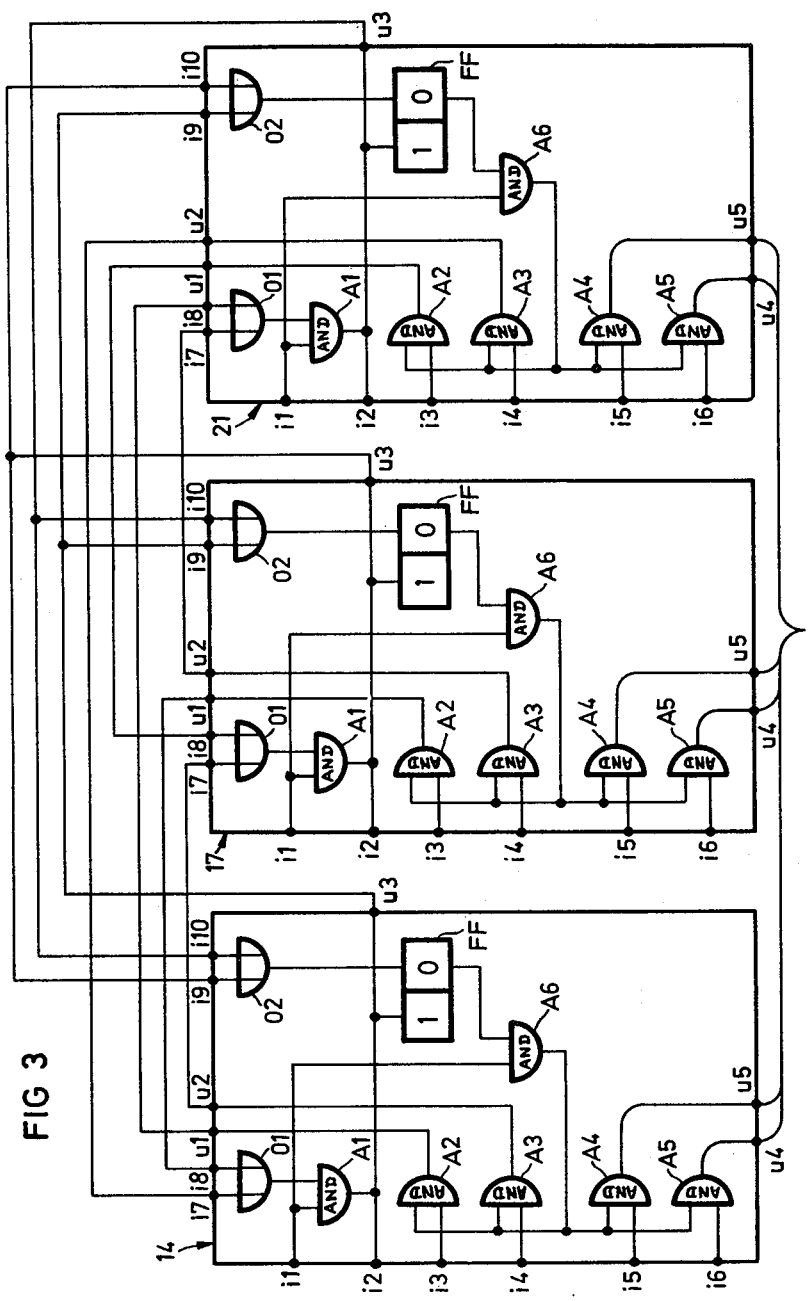

METHOD AND AN APPARATUS FOR REMOTE
CONTROL OF A VEHICLE OR A MOBILE
ENGINE

TECHNICAL FIELD

The present invention relates to apparatus for remote control of a vehicle or a mobile engine in executing a sequence of functions that can have motion phases and/or operation phases, such as moving up to a place, loading or unloading goods at this place and moving back from said place, during which sequence different control modes will be employed at different times, such that the vehicle/engine is controlled according to a first control mode while a first phase is executed and then, upon transition to a second phase, switching takes place to a second control mode, said remote control utilizing a system comprising signal transmitting means which are separate from the vehicle/engine, and signal receiving means on the vehicle/engine and which are operatively connectable to actuating means of the vehicle/engine.

BACKGROUND ART

According to the prior art the remote control of movement and operation phases of a vehicle can take place according to several feasible control modes. If during the movement phase the same route to a working place is taken during a large number of sequences, it is suitable to use a guide cable control mode wherein the vehicle/engine during its movement follows an overhead cable or a cable buried in the ground, and control signals are supplied to said cable. These signals generate an electromagnetic field around the cable, that is detected by a set of antenna coils on the vehicle/engine. On the other hand, if the route is frequently changed, perhaps after each sequence, it is more convenient to use a control mode in which the control signals are transmitted by radio. In that case, it is presupposed that an operator who continuously supervises the vehicle/engine attends to the remote control from a control console by means of which practically the same operations can be performed as with the operation control equipment which normally is found on the vehicle/engine.

In the operation phase following the movement phase it is convenient to use the last mentioned control mode or even a manual control mode, since probably the operation phase is often changed.

Switching from one control mode to another and vice versa could be done automatically, e.g. when the transmission of control signals over one control mode is interrupted or ceases. Alternatively, the switching could be done according to a predetermined preference of the control modes. Said pre-requisites for the switching between the control modes could, however, cause non-desirable transitions, e.g. when the transmission of the control signals ceases as a result of a defect in the transmission.

SUMMARY OF THE INVENTION

The object of the present invention is to provide an automatically controlled switching or transition from one control mode to another, said switching eliminating non-desirable transitions caused by accident, spite or defects.

Apparatus embodying the invention comprises a plurality of control devices, at least one of which is located remotely from the vehicle and each of which issues signals to the vehicle in a mode unique to it. Every control device can emit any selected one of a plurality of different operation signals, each commanding performance of a particular operation by the vehicle or some part of it; and in addition every control device can emit switching signals, each of which is distinctive to and designates one of the other control devices and thus signifies that the designated other control device shall assume control of the vehicle. Receiving means at the vehicle comprises a plurality of receivers, one for each control device, each responsive only to signals of the mode emitted by its control device; and preferably each receiver comprises check means for ensuring that only valid and correctly received signals result in outputs to other equipment at the vehicle. For executing the operations commanded by received operation signals the vehicle has actuating means. The vehicle also has a plurality of switching circuits, one for each receiver, so that each switching circuit corresponds to one of the control devices.

Each switching circuit is connected with its receiver, has a connection with the actuating means, and has a connection with each of the other switching circuits. Each switching circuit comprises a memory unit that has an enabling condition and an inhibiting condition. With its memory unit in the enabling condition a switching circuit provides for conduction of operation signals from its receiver to the actuating means and for conduction of switching signals from its receiver to the respective other switching circuits designated by those switching signals; and with its memory unit in the inhibiting condition the switching circuit prevents such conduction. Each switching circuit is capable of conduction only if two essential conditions are met. The first of these conditions is that a switching circuit corresponding to a particular control device shall not be capable of conduction unless and until another control device shall have issued a switching signal designating said particular control device to assume control of the vehicle. This prevents unauthorized and inadvertent assumptions of vehicle control and ensures maintenance at all times of an assigned responsibility for vehicle control. The second condition for conduction by a switching circuit—and thus for control of the vehicle by the control device corresponding to that switching circuit—is that the receiver for that switching circuit shall be correctly receiving valid signals. The imposition of the second condition ensures that control of the vehicle cannot be irretrievably surrendered to a control device which is inoperative (owing, for example, to transmitter or receiver failure) and which, being incapable of transferring control back to an operative control device, would leave the system in a dead condition.

In addition to its memory unit, each switching circuit comprises transfer control means that has an input connection with the receiver for the switching circuit and a transfer output terminal for each of the other switching circuits. When the transfer control means of a switching circuit receives a switching signal from its receiver, it impresses a transfer output upon its transfer output terminal for the switching circuit designated by that switching signal. Each switching circuit further has switching control means comprising an AND-gate, having two input terminals and having an output terminal from which an output is issued when inputs are applied to both of those two input terminals. One of the two input terminals of the switching control means is connected with the transfer output terminal of each of the other switching circuits, for fulfilling the first of the above mentioned two conditions. The other of those two input terminals is connected with the receiver for the switching circuit, for fulfilling the second condition. The output terminal of the switching control means is so connected with the memory unit of its own switching circuit that output from said terminal places that memory unit in its enabling condition, so that the switching circuit conducts when the two conditions are fulfilled; and said output terminal is so connected with the memory units of the other switching circuits that its output places those memory units in their disabling conditions, to thus prevent control of the vehicle by any control device other than one to which control has been assigned and which is capable of control.

BRIEF DESCRIPTION OF THE DRAWINGS

The invention is described in further details below with reference to the accompanying drawings.

FIG. 3 illustrates by means of logic symbolic one example of the structure and the mutual interconnection of switching means for facilitating over three alternative control modes operative connection between signal receiving means and actuating means of the vehicle.

MODE FOR CARRYING OUT THE INVENTION AND INDUSTRIAL APPLICABILITY

Figure 1:
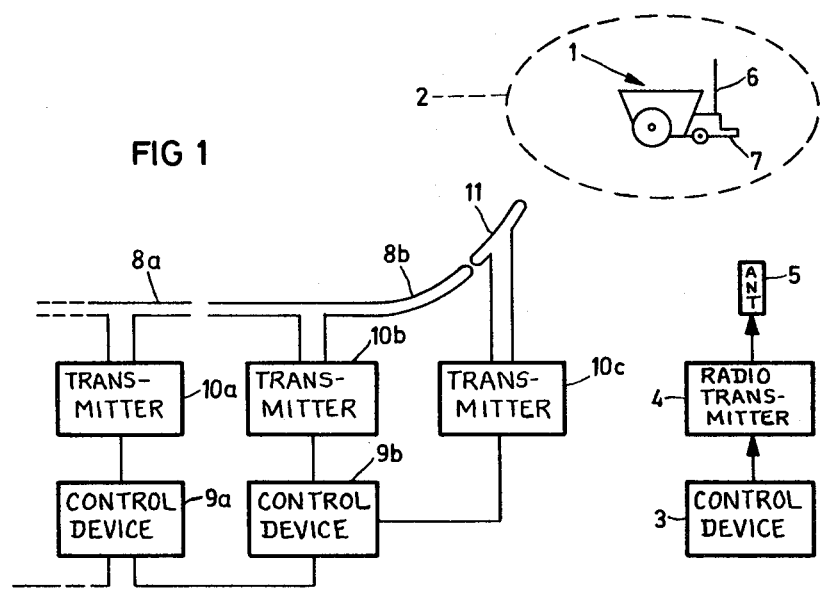
FIG. 1, partly in the form of a block diagram, illustrates one embodiment that provides for switching between a guide cable control mode and a radio control mode for a vehicle.

FIG. 1 shows a remotely controlled vehicle 1 for carrying a load, by which vehicle sequences of motion phases and operation phases are executed. In the operation phase which can include e.g. loading or unloading at a working place 2, the vehicle is controlled by radio by an operator who is at a distance from the vehicle. The operator uses a manual control equipment 3 which includes the controls which are required for controlling the various functions performed by the vehicle. By said controls control signals are generated which are transmitted over a radio transmitter 4 having an antenna 5 to the radio antenna 6 of the vehicle. In a radio receiver connected to said antenna the received radio signals are converted to control signals which unambiguously depend on the signals originally generated in the control equipment 3 and which are allowed to act on the actuating means of the vehicle as is explained in more details with reference to FIG. 2.

It is presupposed that when there are several vehicles at working place 2 each vehicle has its own operator who is responsible for the control of "his" vehicle. Then the radio control takes place over different channels in such a way that an operator can neither inadvertently nor out of spite interfere with a vehicle which is controlled by another operator. However, if convenient an operator can transfer the responsibility of control of "his" vehicle to another operator who due to his location has a better supervision. Then said transfer can be made by switching control modes according to the present invention. Such switching can also be made when a vehicle leaves a working place and is manoeuvred to another adjacent working place, where the responsibility of control is transferred to another operator. The process of transfer of control is subsequently described in detail.

During the motion phase when vehicle 1 transports material to or from working place 2 the vehicle is automatically controlled, signals for the control of the vehicle being transmitted to an inductive antenna 7 on the vehicle via a guide cable. In the figure the guide cable is assumed to be buried in the ground. However, said cable can also be an overhead cable. The guide cable defines the route to working place 2 and preferably is divided into so called blocks as is indicated by reference numerals 8a, 8b in FIG. 1 and is further elucidated in U.S. Pat. No. 3,848,836. The automatic control is accomplished by a control equipment 9a, 9b associated with each guide cable block, said equipment being connected to the respective guide cable blocks 8a, 8b by means of transmitters 10a, 10b. Obviously, several vehicles can be driven along guide cable 8 and can execute similar or different operation phases at working place 2. The control equipment so controls passage of a vehicle along the guide cable that the block closest ahead of a block occupied by the vehicle shall be unoccupied, i.e. free from other vehicles, in order that said vehicle shall be allowed to continue its passage.

From the above it is obvious that switching according to the invention between two control modes does not necessarily mean a change of the signal transmitting medium but said switching can involve a change of radio channels or a transition from one guide cable loop to another.

When multiple radio channels and/or multiple guide cable loops are involved each control mode realized by a radio channel or a guide cable loop has a respective characteristic, such as a channel number. In switching to any such control mode the command signal used and described below will include said channel characteristic.

In order to automatically switch from guide cable control to radio control and vice versa there is at the end of block 8b a special start block 11 which is supplied through a transmitter 10c with signals from control equipment 9b. Vehicle 1 which has moved through blocks 8a and 8b enters block 11 and there receives a command to stop; but the vehicle still communicates with control equipment 9b and receives its commands therefrom. Via loop 11 and the inductive antenna 7 of the vehicle, control equipment 9b delivers a special command signal, i.e., a switching signal, for switching to radio control. As a consequence a switching described with reference to FIG. 2 takes place, said switching making the vehicle non-responsive to guide cable control signals but responsive to control signals transmitted over a predetermined radio channel, as represented by the transmitter 4 and its antenna 5. Conversely, at the switching from radio control to guide cable control, vehicle 1 is, by means of the manual control equipment 3 and radio transmitter 4, manoeuvred in over block 11. Then, in a similar manner as mentioned above a switching command signal is transmitted via the radio transmitter for switching to guide cable control, whereupon the vehicle can be manoeuvred by the inductive transmission of control signals.

Figure 2:
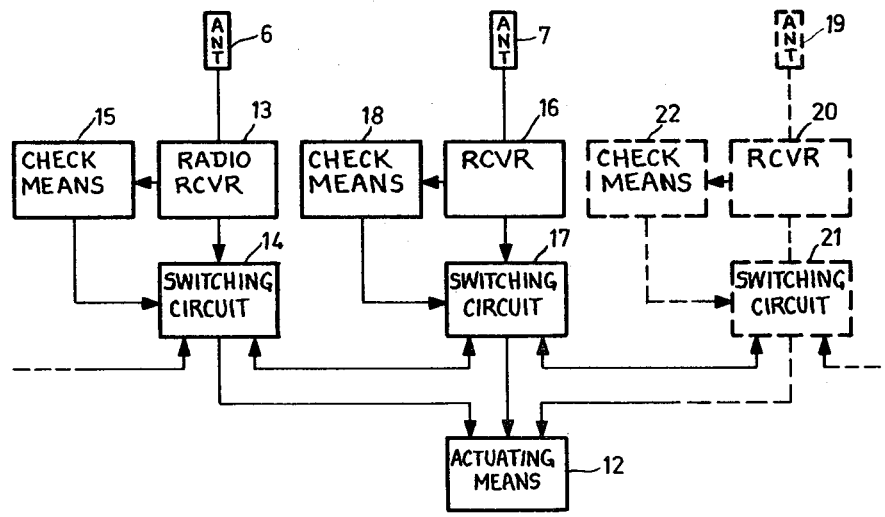
FIG. 2 is a block diagram showing how in various control modes different signal receiving means on the vehicle have operative connection to the actuating means of the vehicle.

FIG. 2 shows actuating means 12 of a vehicle for controlling both the speed and the direction of motion of the vehicle as well as its operative tools or equipment. Said actuating means 12 is actuable in a radio control mode, a control mode for inductive (guide cable) transmission of the control signals to the vehicle and in an additional control mode, shown by dashed lines in the figure, which mode can be one of said control modes or a manual control mode wherein the operator controls the vehicle from a control console on the vehicle.

In the radio control mode the control signals are transmitted from manual control equipment 3 via transmitter 4 and its antenna 5 to a radio receiver 13 over its antenna 6. Between receiver 13 and actuating means 12 there is switching means 14 by means of which the flow of signals from receiver 13 to said actuating means 12 is controlled. Check means 15 connected between the receiver and said switching means check that the control signals are correctly transmitted and received. If this is not so, said check means 15 inhibits switching means 14, thereby stopping the control signals from reaching manoeuvre actuating means 12. Said checking of the control signals can be realized as parity and amplitude check and as identity check of the control mode, the transmitter and the receiver. The identity check means checks that the control signals for a certain control mode emanate from the correct transmitter and reach the intended receiver.

For the inductive control mode there is a receiver channel for inductive reception of control signals. The receiver channel comprises a receiver 16 connected to antenna 7, switching means 17 similar to switching means 14 and connected between receiver 16 and actuating means 12, and check means 18 similar to check means 15. For the control mode illustrated in dashed lines in FIG. 2 there is a corresponding receiver channel including an antenna 19, a receiver 20, switching means 21 and check means 22. Switching means 21 and check means 22 are identical to the above mentioned switching means 14, 17 and check means 15, 18, respectively.

In switching from one control mode to another, switching means 14, 17 and 21 has an important role. Said switching means are interlocked to switch from one control mode to another control mode and to allow control signals of the latter control mode only to reach the actuating means 12 when predetermined conditions are met. These conditions are those mentioned in respect of check means 15, on one hand, and further conditions laid down to prevent undesirable or inadvertent switchings from one control mode to another, on the other hand. Said further conditions will be discussed below in connection with description of FIG. 3.

FIG. 3 shows an example of the structure of a switching unit including switching means 14, 17 and 21 mentioned in connection with FIG. 2. Said switching means are identical, all have ten inputs i1–i10, five outputs u1–u5 and includes six AND-gates A1–A6, two OR-gates 01, 02, and a multivibrator FF serving as a memory member.

Input i1 is connected to one input of each of AND-gates A1 and A6, and the other inputs of those AND-gates, respectively, are connected to the output of OR-gate 01 and "0"-output of multivibrator FF. Input i2 is connected to the output of AND-gate A1, the set-input of multivibrator FF and output u3. Inputs i3–i6 are connected to one input of AND-gates A2–A5, respectively, the other inputs of which all are connected to the output of AND-gate A6. Inputs i7 and i8 are connected to the output of AND-gate A6. Inputs i7 and i8 are connected to the inputs of OR-gate 01 and similarly inputs i9 and i10 are connected to the inputs of OR-gate 02. The outputs of AND-gates A2 and A3 are connected to the outputs u1 and u2, respectively and the outputs of AND-gates A4 and A5 are connected to outputs u4 and u5, respectively. Switching means 14, 17 and 21 are mutually interconnected as described below. In order to simplify identification of the inputs and outputs of the respective switching means, reference numerals according to the following example will be used; 17i9 means input i9 of switching means 17; 14A3 means AND-gate A3 of switching means 14.

Outputs 14u1 and 14u2 are connected to inputs 21i8 ad 17i7, respectively. Similarly 17u1 and 17u2 are connected to 14i8 and 21i7, respectively, and 21u1 and 21u2 are connected to 17i8 and 14i7, respectively. Moreover, there is a connection between 14u3, 17i9 and 21i9, between 17u3, 14i9 and 21i10, and between 21u3, 14i10 and 17i10.

Inputs i1 for receiving input signals are connected to the respective check means, and presupposing that the control signals are correctly transmitted and received as described above a binary "1"-signal is supplied to this input when the respective control mode is actuated. Inputs i2 are switching signal inputs for direct manual selection of signal transmission mode and provide for an initial designation of the control equipment from which the vehicle is to be controlled. Inputs i3 and i4 are switching signal inputs intended for selection of another signal transmission mode and are connected to the respective receiver. This is also the case for inputs i5 and i6 which are operation signal inputs, i.e. over these inputs operation signals are supplied for commanding the various functions of the vehicle. Said operation signals are to be transmitted to actuating means 12 of the vehicle via outputs u4 and u5, providing the above mentioned conditions are met.

By inputs i7 and i8 of e.g. switching means 14 it is possible to obtain from switching means 21 and 17, respectively, a change into signal transmission via that transmission mode to which switching means 14 belongs, i.e. radio. Of course, corresponding conditions hold for the other switching means 17 and 21. For instance, the switching off of the radio transmission mode for obtaining a change into any one of the other transmission modes takes place over inputs i9 or i10. The switching off of the other transmission modes, which occurs when transmission has been established over a transmission mode, takes place over output u3.

Below follows by way of example a description of a direct manual enablement of the radio control mode and a remotely controlled change into the inductive control mode. By means of a binary "1"-signal supplied to input i2, multivibrator 14FF is triggered, with the result that the same signal appears on the output of multivibrator 14FF. In this way one condition of gate 14A6 is met; the other condition is met if i1 receives a binary "1"-signal from check means 15, i.e. if the transmission between radio transmitter 4 and radio receiver 13 is found to be correct. Said signal on input 14i2 reaches over output 14u3 and inputs 17i9 and 21i9 to OR-gates 1702 and 2102 of switching means 17 and 21, respectively, and here causes reset of multivibrators 17FF and 21FF, respectively, i.e. those multivibrators are set to the zero output state shown in FIG. 3 with the result that no control signals can pass through switching means 17 and 21. If as mentioned above the conditions of gate 14A6 are met this means that gates 14A2, 14A3, 14A4 and 14A5 are enabled. Thus, operation signals supplied by radio receiver 13 to inputs 14i5 and 14i6 can pass gates 14A4 and 14A5 and over outputs 14u4 nd 14u5 can reach actuator means 12 in order to cause the vehicle to perform operations in accordance with the operation signals transmitted by radio.

In switching into an inductive control mode the following events take place: A switching signal in the form of a binary "1"-signal is transmitted by radio and is supplied to input 14i4 and from there to gate 14A3, which is alrady enabled, as mentioned above. The output signal of gate 14A3 reaches through output 14u2, input 17i7 and OR-gate 17O1 to AND-gate 17A1. At the same moment a signal is received over input 17i1, signifying that the inductive signal is being received and the conditions of gate 17A1 are met, resulting in multivibrator 17FF being set to a binary "1"-state. In a corresponding way as described above regarding switching means 14 multivibrators 14FF and 21FF will be reset to a binary "0"-state and consequently the signal transmission over inputs 14i5 and 14i6 and gates 14A4 and 14A5 to inputs 14u4 and 14u5 is interrupted.

It should be mentioned that if the number of alternative control modes is four instead of three as shown in FIG. 3, each switching means will have to be amplified to the following extent: An additional AND-gate is required with pertaining inputs and outputs of the switching means and having an operation analogous to that of AND-gates A2, A3. Moreover, OR-gates 01 and 02 each must have an additional input with corresponding inputs to the switching means. The corresponding amplification is required if the number of control modes is increased with still another mode.

I claim:

1. Apparatus for controlling operations of a vehicle from a selected one of a plurality of control devices, at least one of which is remote from the vehicle and each of which is arranged to emit any selected one of a plurality of different operation signals, each commanding performance of a particular operation, said apparatus comprising, at the vehicle, receiving means for receiving signals emitted from said control devices and actuating means for performing operations commanded by received operation signals, said apparatus being characterized by:

A. each of said control devices being further arranged
        (1) to emit its signals in a mode unique to it and
        (2) to selectably emit a switching signal distinctive to and designating each of the other control devices and whereby conversion to control by the designated other control device is commanded;
    B. said receiving means comprising a plurality of receivers, one for each of said control devices, each responsive only to signals of the mode emitted by its control device; and
    C. a plurality of switching circuits at the vehicle, one for each of said receivers,
        (1) each said switching circuit having
            (a) an input connection with its receiver and
            (b) an output connection with said actuating means, and
        (2) each said switching circuit comprising
            (a) a memory unit having an enabling input terminal and an inhibiting input terminal and arranged to produce
                (i) one response to an input to its enabling input terminal, permitting conduction of operation signals and switching signals through the switching circuit from its receiver, and
                (ii) another response to an input to its inhibiting input terminal, preventing such conduction,
            (b) transfer command means having a transfer output terminal for each of the other switching circuits and responsive to a switching signal from the receiver for its switching circuit to issue a transfer output to its transfer output terminal for the one of said other switching circuits that is designated by the switching signal, and
            (c) switching control means comprising an AND-gate having a pair of control input terminals and a control output terminal and which produces an output at said output terminal in response to inputs at both of said control input terminals;
                (i) one of said control input terminals being connected with the transfer output terminals of each of said other switching circuits, to receive transfer outputs therefrom as inputs,
                (ii) the other of said control input terminals being connected with the receiver for its switching circuit to receive inputs therefrom in response to signals received by that receiver, and
                (iii) said control output terminal being connected with the enabling input terminal of the memory unit of its switching circuit and the inhibiting input terminal of the memory unit for each of the other switching circuits.

2. Apparatus for controlling operations of a vehicle from a selected one of a plurality of control devices, at least one of which is remote from the vehicle and each of which is arranged to emit any selected one of a plurality of different operation signals, each commanding performance of a particular operation, said apparatus comprising, at the vehicle, receiving means for receiving signals emitted from said control devices and actuating means for performing operations commanded by received operation signals, said apparatus being characterized by:

A. each of said control devices being further arranged
        (1) to emit its signals in a mode unique to it and
        (2) to selectably emit a switching signal distinctive to and designating each of the other control devices and whereby transfer to control by the designated other control device is commanded;
    B. said receiving means comprising a plurality of receivers, one for each of said control devices, each responsive only to signals of the mode emitted by its control device;
    C. a plurality of switching circuits at the vehicle, one for each of said receivers, each said switching circuit having
        (1) an input connection with its receiver to receive operation signals and switching signals therefrom,
        (2) an operations output connection with said actuating means, through which the switching circuit, when it is in an enabled state, can transfer to the actuating means operation signals received by its receiver, and (3) a transfer connection with each of the other switching circuits;

D. transfer means in each switching circuit responsive to a switching signal from its receiver for producing a transfer output at its transfer connection with the one of said other switching circuits that is designated by the switching signal; and E. control means in each switching circuit for placing the switching circuit in its said enabled state in response to both
   (1) receipt of signals from its receiver and
   (2) receipt of a transfer output from another switching circuit.

3. The apparatus of claim 2, further characterized by: each said switching circuit further having
   (4) an inhibit connection with each of said other switching circuits; and F. means in each switching circuit, operative when the switching circuit is in its said enabled state, for issuing to each of the other switching circuits, through its inhibit connections with the same, an inhibiting output that converts said other switching circuits out of their enabled states.

4. The apparatus of claim 2 wherein said control means in each switching circuit comprises:
   (1) and AND-gate having
      (a) one input terminal connected with the receiver for the switching circuit,
      (b) another input terminal that comprises said transfer connection with each of the other switching circuits, and
      (c) an output terminal at which an enabling output appears in response to inputs at both of those input terminals; and
   (2) a memory unit having two conditions
      (a) arranged to maintain the switching circuit in its enabled state while one of said conditions persists and to maintain the switching circuit out of its enabled state while the other of said conditions persists, and
      (b) so connected with said output terminal of said AND-gate as to be placed in its said one condition by an enabling output thereat.

5. The apparatus of claim 4 wherein said transfer connection with each of the other switching circuits further comprises an OR-gate having
   (1) an input terminal for each of the other switching circuits, each connected with the transfer means of its other switching circuit, and
   (2) an output terminal connected with said other input terminal of the AND-gate.

6. The apparatus of claim 4 wherein said memory unit has a first input terminal that is connected with said output terminal of the AND-gate and whereat said enabling output is applied to place the memory unit in its said one condition, further characterized by:
   said memory unit having a second input terminal for receiving an input that places the memory unit in its said other condition and which is connected with said output terminal of the AND-gate of each of the other switching circuits, so that issuance of an output from the output terminal of the AND-gate of one switching circuit takes every other switching circuit out of its enabled state.

* * * * *